(12) United States Patent
Yan et al.

(10) Patent No.: US 12,118,037 B2
(45) Date of Patent: Oct. 15, 2024

(54) DATABASE MANAGEMENT METHOD AND APPARATUS BASED ON LOOKUP TABLE

(71) Applicant: YUSUR TECHNOLOGY CO., LTD., Beijing (CN)

(72) Inventors: Guihai Yan, Beijing (CN); Lutang Wang, Beijing (CN); Hongfeng Gao, Beijing (CN)

(73) Assignee: YUSUR TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 17/901,443

(22) Filed: Sep. 1, 2022

(65) Prior Publication Data

US 2022/0414155 A1 Dec. 29, 2022

Related U.S. Application Data

(63) Continuation of application No. PCT/CN2020/107193, filed on Aug. 5, 2020.

(30) Foreign Application Priority Data

Mar. 3, 2020 (CN) .......................... 202010139975.8

(51) Int. Cl.
G06F 17/00 (2019.01)
G06F 7/00 (2006.01)
(Continued)

(52) U.S. Cl.
CPC ........ G06F 16/9017 (2019.01); G06F 16/221 (2019.01); G06F 16/2282 (2019.01)

(58) Field of Classification Search
CPC ............... G06F 16/9017; G06F 16/221; G06F 16/2282
(Continued)

(56) References Cited

U.S. PATENT DOCUMENTS 8,150,850 B2 4/2012 Herrnstadt
2009/0141716 A1* 6/2009 Chang ............... G06F 16/90344
370/389

(Continued)

FOREIGN PATENT DOCUMENTS

CN 102804168 11/2012
CN 103377289 10/2013
(Continued)

OTHER PUBLICATIONS

International Search Report, issued in the corresponding PCT application No. PCT/CN2020/107193, dated Dec. 9, 2020 (including the English translation), 8 pages.
(Continued)

*Primary Examiner* — Pavan Mamillapalli
(74) *Attorney, Agent, or Firm* — HSML P.C

(57) ABSTRACT

Provided are a database management method and apparatus based on a lookup table. The method comprises: acquiring a data management operation request; retrieving a three-level storage table in response to the data management operation request; and adjusting the three-level storage table according to an operation requested by the data management operation request, so as to obtain the adjusted three-level storage table, wherein the three-level storage table includes: a page information table of data; the column information table of data; and the data table for recording information of a piece of data by means of a row of data. By means of the method, the problem of the low efficiency of existing database management based on a lookup table is solved, and the aim of simply and efficiently carrying out a lookup table operation is thus achieved.

20 Claims, 5 Drawing Sheets

(51) Int. Cl.
*G06F 16/22* (2019.01)
*G06F 16/901* (2019.01)

(58) Field of Classification Search
USPC ........................................................ 707/802
See application file for complete search history.

(56) References Cited

U.S. PATENT DOCUMENTS

| | | | | |
|---|---|---|---|---|
| 2011/0314027 A1* | 12/2011 | Xu | ....................... | G06F 16/2228 |
| | | | | 707/E17.014 |
| 2013/0304745 A1* | 11/2013 | Dhuse | ................. | G06F 16/2272 |
| | | | | 707/741 |
| 2015/0032684 A1* | 1/2015 | Gupta | ................... | G06F 16/283 |
| | | | | 707/600 |
| 2015/0169655 A1* | 6/2015 | Gupta | ................... | G06F 16/254 |
| | | | | 707/602 |
| 2016/0314156 A1* | 10/2016 | Konik | ................... | G06F 16/219 |
| 2018/0089266 A1* | 3/2018 | Vujic | ....................... | G06F 16/22 |
| 2019/0377743 A1* | 12/2019 | Gupta | ................... | G06F 16/283 |

FOREIGN PATENT DOCUMENTS

| | | |
|---|---|---|
| CN | 106326309 | 1/2017 |
| CN | 107256233 | 10/2017 |
| CN | 108932313 | 12/2018 |
| CN | 111427885 | 7/2020 |

OTHER PUBLICATIONS

First Chinese Office Action issued in corresponding Chinese Patent Application No. 202010139975.8, dated Dec. 21, 2022, 9 pages, machine translation provided.

Supplementary Search Report for corresponding Chinese Patent Application No. 202010139975.8, dated Dec. 16, 2022, 4 pages, machine translation provided.

* cited by examiner

| Address | Coladds(16 bits) | Coladde(16 bits) | Colnum(8 bits) | Status(1bit) |
|---|---|---|---|---|
| Table id | Table C idle address | Table C idle address | 1 | 1 |

| Address | Nxtaddr (16 bits) | Conseq (1 bit) | Status(1bit) | ColWidth (16 bits) | BlockNum (16 bits) | BlockStart (16 bits) | BlockEnd (16 bits) |
|---|---|---|---|---|---|---|---|
| Table C idle address | Table C idle ID | 0 | 1 | 0 | 1 | Table D idle ID | Table D idle ID |

| Address | DataADds (32 bits) | DataAdde (32 bits) | DataAddc (32 bits) | DownBAdd (16 bits) | Downsed (1 bits) | UPBAdd (16 bits) | Upsed (1 bits) | Status(1bit) |
|---|---|---|---|---|---|---|---|---|
| Table D idle ID | 0 | 0 | 0 | Table D idle ID | 0 | Table D idle ID | 0 | 1 |

Fig.6

| Address | Nxtaddr (16 bits) | Conseq (1 bit) | Status(1bit) | ColWidth (16 bits) | BlockNum (16 bits) | BlockStart (16 bits) | BlockEnd (16 bits) |
|---|---|---|---|---|---|---|---|
| Column address for down connection | Remain unchanged | 1 | 1 | 0 | Incremented by 1 | Remain unchanged | Table D idle ID |

Fig.7

| Address | DataADds (32 bits) | DataAdde (32 bits) | DataAddc (32 bits) | DownBAdd (16 bits) | Downsed (1 bits) | UPBAdd (16 bits) | Upsed (1 bits) | Status(1bit) |
|---|---|---|---|---|---|---|---|---|
| Original BlockEnd | Remain unchanged | Remain unchanged | Remain unchanged | Table D idle ID | 0→1 | Remain unchanged | Remain unchanged | 1 |
| Table D idle ID | 0 | 0 | 0 | Table D idle ID | 0 | Original BlockEnd | 1 | 1 |

Fig.8

| Address | Coladds(16 bits) | Coladde(16 bits) | Colnum(8 bits) | Status(1bit) |
|---|---|---|---|---|
| Table ID | Remain unchanged | Table C idle address | Incremented by 1 | 1 |

Fig.9

| Address | Nxtaddr (16 bits) | Conseq (1 bit) | Status(1bit) | ColWidth (16 bits) | BlockNum (16 bits) | BlockStart (16 bits) | BlockEnd (16 bits) |
|---|---|---|---|---|---|---|---|
| Original ColAdde | Table C idle ID | 1 | 1 | 0 | Remain unchanged | Remain unchanged | Remain unchanged |
| Table C idle ID | Table C idle ID | 0 | 1 | 0 | 1 | Table D idle ID | Table D idle ID |

Fig.10

| Address | DataADds (32 bits) | DataAdde (32 bits) | DataAddc (32 bits) | DownBAdd (16 bits) | Downsed (1 bits) | UPBAdd (16 bits) | Upsed (1 bits) | Status(1bit) |
|---|---|---|---|---|---|---|---|---|
| Table D idle ID | 0 | 0 | 0 | Table D idle ID | 0 | Table D idle ID | 0 | 1 |

Fig.11

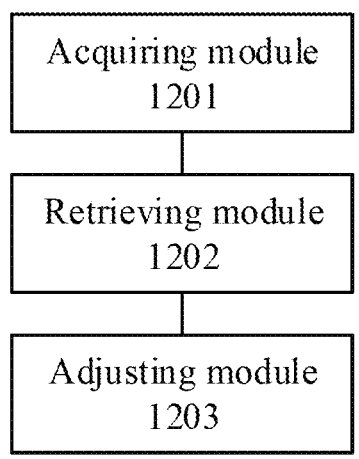

Fig.12

DATABASE MANAGEMENT METHOD AND APPARATUS BASED ON LOOKUP TABLE

This application is a continuation of International Application No. PCT/CN2020/107193, filed on Aug. 5, 2020, which claims priority to Chinese Patent Application No. 202010139975.8 filed on Mar. 3, 2020, both of which are hereby incorporated by reference in their entireties.

TECHNICAL FIELD

The present invention relates to the field of computer technologies, and in particular to a database management method and apparatus based on a lookup table.

BACKGROUND

As the amount of data continues to increase, time delays in access to databases are getting longer and longer. Many tasks that can be easily done with traditional methods based on small data have become quite difficult when it comes to big data. Currently, the fastest SSD storages are able to reach a read speed of 12 GB/s. Based on this read-write speed, however, it will still take 33 hours to complete one query in the form of a full search if the database has a storage capacity of 15 TB. To increase the speed in database query, the methods of designing database-specific processors are utilized generally to improve performance.

Nevertheless, most of the operations on a database are data traversal, and a large number of data objects need to be managed during data processing. At present, data object management is generally implemented based on a lookup table. As for how to efficiently implement complex lookup table functions at the hardware level, no effective solution has been proposed so far.

SUMMARY

Embodiments of the present invention provide a database management method and apparatus based on a lookup table, in order to achieve the technical effect that lookup table functions are implemented in a simple and efficient way.

In an aspect, provided is a database management method based on a lookup table, including:
  acquiring a data management operation request;
  retrieving a three-level storage table in response to the data management operation request; and
  adjusting the three-level storage table according to an operation requested by the data management operation request, so as to obtain the adjusted three-level storage table, wherein the three-level storage table includes: a page information table of data for recording information of a page of data by means of a row of data and associating same with a plurality of columns in a column information table of data; the column information table of data for recording information of an array in a data table by means of a row of data and associating same with a plurality of arrays in the data table; and the data table for recording information of a piece of data by means of a row of data.

In an implementation, the data management operation request includes at least one of: an insertion operation request, an update operation request, a deletion operation request, and a query operation request.

In an implementation, the insertion operation request includes at least one of: a new page insertion request, a column lengthening insertion request, and a new column insertion request.

In an implementation, in case that the data management operation request is the new page insertion request, adjusting the three-level storage table according to the data management operation request so as to obtain the adjusted three-level storage table includes:
  querying, in response to the new page insertion request, a page information table of data according to an input address in the new page insertion request;
  requesting an insertion address and data from a data table in case that a status value of rows indicated by the input address is determined to be 0;
  inserting, into the requested insertion address, data to be inserted;
  requesting an idle address from a column information table of data and inserting column information, wherein an address for storage of a first piece of data and an address for storage of a last piece of data in the column information are both set as the insertion address requested from the data table; and
  inserting, into the page information table of data, a row of data for characterizing page data information requested to be inserted by the new page insertion request.

In an implementation, in case that the data management operation request is the column lengthening insertion request, adjusting the three-level storage table according to the data management operation request so as to obtain the adjusted three-level storage table includes:
  querying, in response to the column lengthening insertion request, a page information table of data according to an input address in the column lengthening insertion request, so as to obtain a corresponding status value, a number of columns in a column group, an address of a first column of the column group, and an address of a last column of the column group;
  determining the presence of this page if the status value is 1;
  comparing input data in the column lengthening insertion request with a numerical value for the number of columns in the column group; querying, starting from the address of the first column of the column group, a column information table of data according to a connection relationship of the column information table of data if the input data is less than the number of columns in the column group; and counting the number of queries;
  stopping querying when the result of counting is equal to the input data, and recording an address of the last piece of data of an array of this row;
  searching the database for a new idle address, inserting a row of data after the recorded address of the last piece of data of the array of this row, and then updating storage information in a storage address of the last piece of data of the data of this row; and
  updating the column information table of data.

In an implementation, in case that the data management operation request is the new column insertion request, adjusting the three-level storage table according to the data management operation request so as to obtain the adjusted three-level storage table includes:
  querying, in response to the new column insertion request, a page information table of data according to an input address in the new column insertion request, so as to obtain a corresponding status value, a number of columns in a column group, an address of a first column of the column group, and an address of a last column of the column group;

determining, through the status value, whether this page is present;

comparing input data in the new column insertion request with a numerical value for the number of columns in the column group if this page is present, and if the input data is greater than the number of columns in the column group, then performing an insertion operation after requesting of an idle address by the data table; and updating the page information table of data and the column information table of data after the insertion is completed.

In another aspect, provided is a database management method based on a lookup table, including:

an acquiring module configured to acquire a data management operation request;

a retrieving module configured to retrieve a three-level storage table in response to the data management operation request; and an adjusting module configured to adjust the three-level storage table according to an operation requested by the data management operation request, so as to obtain the adjusted three-level storage table, wherein the three-level storage table includes: a page information table of data for recording information of a page of data by means of a row of data and associating same with a plurality of columns in a column information table of data; the column information table of data for recording information of an array in a data table by means of a row of data and associating same with a plurality of arrays in the data table; and the data table for recording information of a piece of data by means of a row of data.

In an implementation, the data management operation request includes at least one of: an insertion operation request, an update operation request, a deletion operation request, and a query operation request.

In an implementation, the insertion operation request includes at least one of: a new page insertion request, a column lengthening insertion request, and a new column insertion request.

In an implementation, the adjusting module includes:

a querying unit configured to request, in case that the data management operation request is the new page insertion request, an insertion address and data from a data table in case that a status value of rows indicated by the input address is determined to be 0;

a first inserting unit configured to insert, into the requested insertion address, data to be inserted;

a second inserting unit configured to request an idle address from a column information table of data and insert column information, wherein an address for storage of the first piece of data and an address for storage of the last piece of data in the column information are both set as the insertion address requested from the data table; and a third inserting unit configured to insert, into the page information table of data, a row of data for characterizing page data information requested to be inserted by the new page insertion request.

In an implementation, the apparatus is implemented based on a field programmable gate array or an application-specific integrated circuit.

In yet another aspect, provided is a nonvolatile computer-readable storage medium having a computer program stored thereon that, when executed by a processor, generates the above apparatus.

In the embodiments of the present invention, provided is a database management method based on a lookup table, in which a three-level storage table is set to store: page information of data, column information of data, and data, respectively, such that the problem of the low efficiency of existing database management based on a lookup table is solved, and the aim of simply and efficiently carrying out a lookup table operation is thus achieved.

BRIEF DESCRIPTION OF DRAWINGS

The accompanying drawings illustrated herein are used to provide a further understanding of the present invention, form a part of the present application, and do not constitute a limitation to the present invention. In the drawings:

FIG. 6 is a schematic diagram of table D subsequent to new page insertion according to the embodiments of the present invention;

FIG. 7 is a schematic diagram of table C subsequent to column lengthening insertion according to the embodiments of the present invention;

FIG. 8 is a schematic diagram of table D subsequent to column lengthening insertion according to the embodiments of the present invention;

FIG. 9 is a schematic diagram of table T subsequent to new column insertion according to the embodiments of the present invention;

FIG. 10 is a schematic diagram of table C subsequent to new column insertion according to the embodiments of the present invention;

FIG. 11 is a schematic diagram of table D subsequent to new column insertion according to the embodiments of the present invention; and FIG. 12 is a structural block diagram of a database management apparatus based on a lookup table according to the embodiments of the present invention.

DESCRIPTION OF EMBODIMENTS

For a better clarity of the objects, technical solutions and advantages of the present invention, the present invention will be further described in details in conjunction with the implementations and accompanying drawings. Here, the exemplary implementations of the present invention and the description thereof are used to explain the present invention, but not as a limitation to the present invention.

Figure 1:
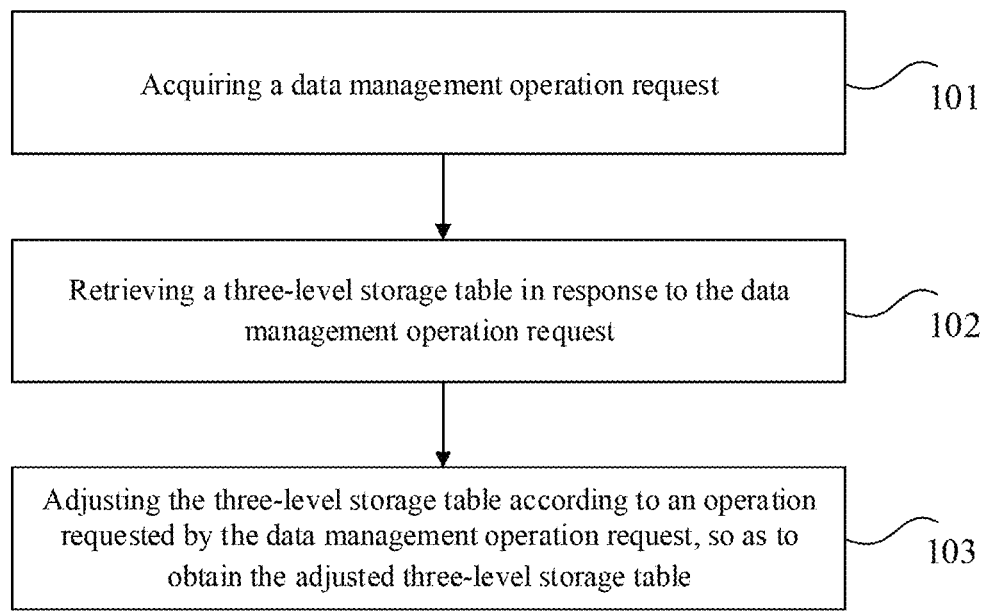
FIG. 1 is a method flowchart of a database management method based on a lookup table according to the embodiments of the present invention.

FIG. 1 is a method flowchart of an embodiment of a database management method based on a lookup table as described in the present application. Even though the present application provides the method operation steps or device structures as illustrated in the embodiments or accompanying drawings described below, based on conventional or non-creative efforts, the method or apparatus may include more or fewer operation steps or module units. In steps or structures for which there are no logically required causal relationships, the sequence of execution of these steps or the module structure of the apparatus is not limited to the sequence of execution or the module structure described in the embodiments of the present application and shown in the accompanying drawings. During actual application of the apparatus or end product of the method or module structure, sequential execution or parallel execution is possible in accordance with the method or module structure connections shown in the embodiments or accompanying drawings (e.g., in a parallel processor or a multithread processing environment, even in a distributed processing environment).

As shown in FIG. 1, the database management method based on a lookup table may include the following steps:

S101: acquiring a data management operation request;

S102: retrieving a three-level storage table in response to the data management operation request; and S103: adjusting the three-level storage table according to an operation requested by the data management operation request, so as to obtain the adjusted three-level storage table;

wherein the three-level storage table includes: a page information table of data for recording information of a page of data by means of a row of data and associating the same with a plurality of columns in a column information table of data; the column information table of data for recording information of an array in a data table by means of a row of data and associating the same with a plurality of arrays in the data table; and the data table for recording information of a piece of data by means of a row of data.

In the above embodiment, provided is a database management method based on a lookup table, in which a three-level storage table is set to store: page information of data, column information of data, and data, respectively, such that the problem of the low efficiency of existing database management based on a lookup table is solved, and the aim of simply and efficiently carrying out a lookup table operation is thus achieved.

The above data management operation request may include, but not limited to, at least one of: an insertion operation request, an update operation request, a deletion operation request, and a query operation request. That is, these operations may be performed for the above three-level storage table.

In particular, the above insertion operation request may include, but not limited to, at least one of: a new page insertion request, a column lengthening insertion request, and a new column insertion request. Given below is the detailed description thereof:

1) in case that the data management operation request is the new page insertion request, adjusting the three-level storage table according to the data management operation request so as to obtain the adjusted three-level storage table may include:

querying, in response to the new page insertion request, a page information table of data according to an input address in the new page insertion request;

requesting an insertion address and data from a data table in case that a status value of rows indicated by the input address is determined to be 0;

inserting, into the requested insertion address, data to be inserted;

requesting an idle address from a column information table of data and inserting column information, wherein an address for storage of a first piece of data and an address for storage of a last piece of data in the column information are both set as the insertion address requested from the data table; and inserting, into the page information table of data, a row of data for characterizing page data information requested to be inserted by the new page insertion request.

2) in case that the data management operation request is the column lengthening insertion request, adjusting the three-level storage table according to the data management operation request so as to obtain the adjusted three-level storage table may include:

querying, in response to the column lengthening insertion request, a page information table of data according to an input address in the column lengthening insertion request, so as to obtain a corresponding status value, a number of columns in a column group, an address of a first column of the column group, and an address of a last column of the column group;

determining, through the status value, whether this page is present;

comparing input data in the column lengthening insertion request with a numerical value for the number of columns in the column group if this page is present; querying, starting from the address of the first column of the column group, a column information table of data according to a connection relationship of the column information table of data if the input data is less than the number of columns in the column group; and counting the number of queries;

stopping querying when the result of counting is equal to the input data, and recording an address of the last piece of data of an array of this row;

searching the database for a new idle address, inserting a row of data after the recorded address of the last piece of data of the array of this row, and then updating storage information in a storage address of the last piece of data of the data of this row; and updating the column information table of data.

3) in case that the data management operation request is the new column insertion request, adjusting the three-level storage table according to the data management operation request so as to obtain the adjusted three-level storage table may include:

querying, in response to the new column insertion request, a page information table of data according to an input address in the new column insertion request, so as to obtain a corresponding status value, a number of columns in a column group, an address of a first column of the column group, and an address of a last column of the column group;

determining, through the status value, whether this page is present;

comparing input data in the new column insertion request with a numerical value for the number of columns in the column group if this page is present, and if the input data is greater than the number of columns in the column group, then performing an insertion operation after requesting of an idle address and data by the data table; and updating the page information table of data and the column information table of data after the insertion is completed.

The above method is described below with reference to a specific embodiment. However, it is to be noted that this specific embodiment is merely for a better description of the present invention, without constituting inappropriate limitations to the present application.

Figure 2:
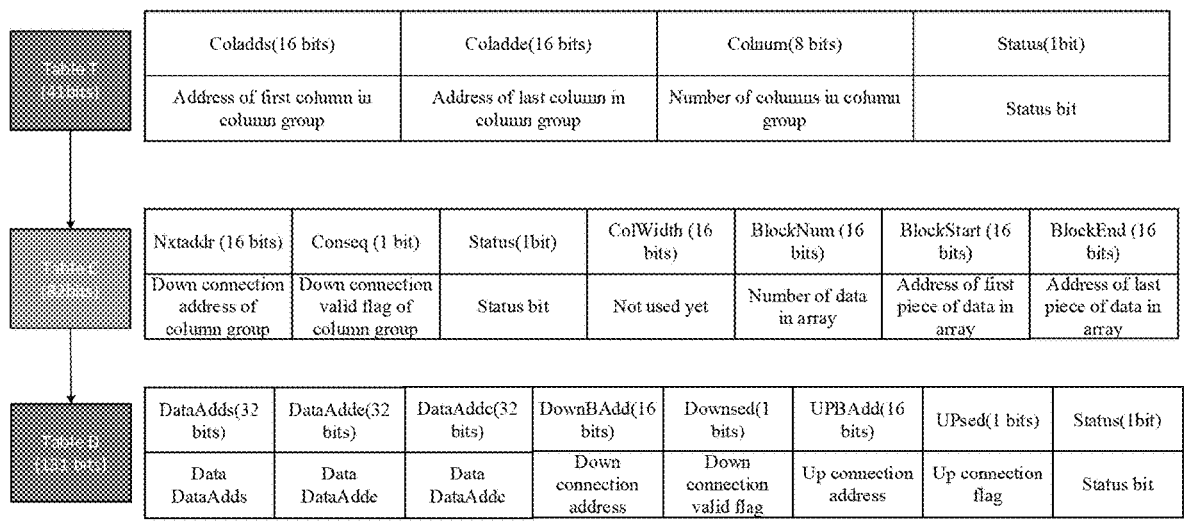
FIG. 2 is a schematic diagram illustrating the master-slave relationship of a multilevel storage data table according to the embodiments of the present invention.

In this embodiment, provided is a table for multilevel storage data, the master-slave relationship of which may be shown in FIG. 2. In this table, the first-level storage table TabLUT (referred to as table T) is a page information table of data; the second-level storage table ColLUT (referred to as table C) is a column information table of data; the third-level storage table DataLUT (referred to as table D) is used for storing data and thus is a data table. This three-level storage table is indicative of the relationships among a plurality of pieces of storage data, with the tables of all levels supporting insertion, update, deletion and query operations.

The relationships in the above three-level storage table, as well as the data format and meaning of certain row of data in the tables of all levels will be described below.

Table T: a row of data keeps a record of the relevant information of "a page of data", this page is a "column group" that is composed of a plurality of arrays arranged in parallel, and each column is one array. Each row of information in table T keeps a record of start address Coladds (bit width is 16) where the first column of the relevant "column group" is stored in the next-level table C, end address Coladde (bit width is 16) for storage of the last column of array, the number of columns Colnum (bit width is 8) in the "column group", and status bit Status (bit width is 1) used to indicate validity/invalidity of this row of data, wherein status being 1 indicates that the data stored at this layer of address is valid, and status being 0 indicates that the data stored at this layer of address is invalid or has been deleted.

Table C: this table serves as a storage table of column information, and a row of data of this table keeps a record of the relevant information of "one array" stored in table D, with a tentative depth of 1024 rows. The storage data includes the number of data BlockNum (bit width is 16) in "one array", address BlockStart (bit width is 16) for storage of the first piece of data, address BlockEnd (bid width is 16) for storage of the last piece of data, and flag bit Status (bit width 1) for judging whether or not the address where this array is stored is valid. In addition, valid flag Conseq (bit width 1) for down connection of multiple rows of data as well as down connection address Nxtaddr (bit width 16) of the column group are also stored, and multiple rows of data of table C can be connected together through down connection information (Conseq, Nxtaddr) and are represented as one "column group", i.e., one page.

Table D: its main body is a storage table for multiple rows of data, with a tentative depth of 1024 rows. Each row of data keeps a record of the relevant information of "a piece of data", and multiple rows of data are connected together through up and down connection information to create "one array". Data itself is DataAdds (bit width is 32), DataAdde (bit width is 32), DataAddc (bit width is 32), incidental down connection address DownBadd (bit width is 16), down connection flag Downseq (bit width is 1), up connection address UpBAdd (bit width is 16), up connection flag Upseq (bit width is 1), and valid flag signal Status (bit width is 1). Among all these, Status being 1 indicates that this row of data is valid, Status being 0 indicates that this row of data is invalid, and a row of data that is invalid is considered as having been deleted. "A piece of data" may be composed of one row of, or multiple rows of DataAdds, DataAdde and DataAddc. Also, the locations for storage of multiple rows of data are random and addresses are not necessarily consecutive. With regard to every piece of sub data in "a piece of data" composed of multiple rows, the relationships among multiple rows of data are recorded through connection information and connection flags.

Downseq of certain row of data being 1 indicates valid down connection, i.e., there exists data for down connection after this row of data. DownBadd indicates the address of down connection data. Downseq being 0 indicates no data for down connection, i.e., this row is the last row of "one array", and meanwhile DownBadd is the address of this row itself. The same applies to up connection signal Upseq and the address of up connection data UpBAdd. If only one row of data is stored in "one array", then its Downseq and Upseq are both 0, and two addresses, i.e., up and down, are both its own addresses; in case of the first row of "one array" composed of multiple rows of data, for the first row of data, up connection flag Useq is 0, up address UpBAdd is itself, down connection flag Downseq is 1, down address DownBadd is the address of the second row; the down connection address of the last row is itself and flag bit Downseq is 0.

Figures 3, 4, 5:
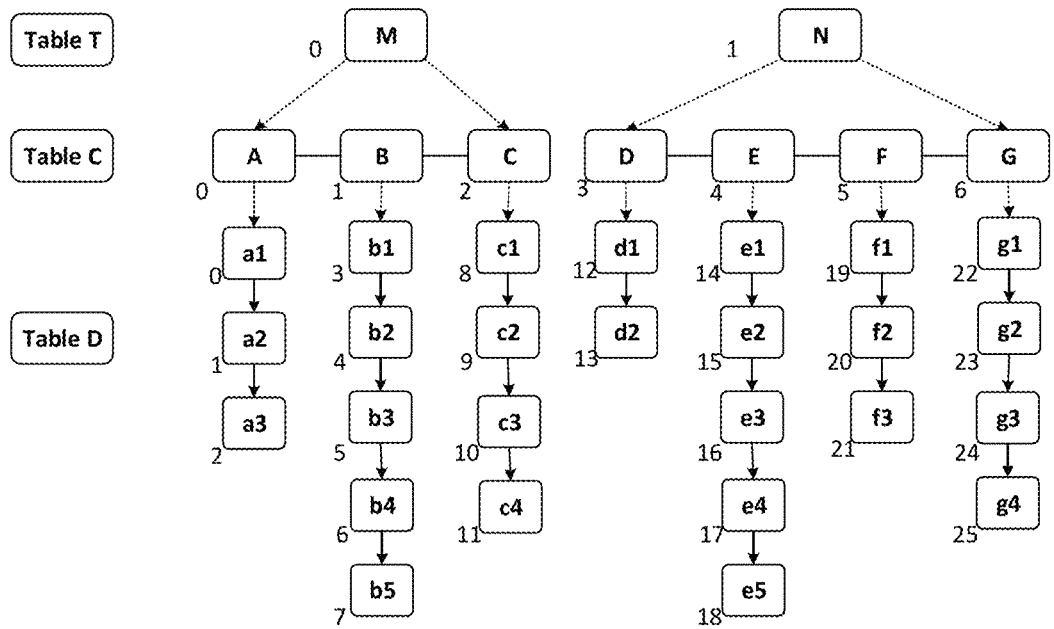
FIG. 3 is a schematic structural diagram of a three-level storage data table according to the embodiments of the present invention.
FIG. 4 is a schematic diagram of table T subsequent to new page insertion according to the embodiments of the present invention.
FIG. 5 is a schematic diagram of table C subsequent to new page insertion according to the embodiments of the present invention.

In general, as shown in FIG. 3, one row in table T indicates one page and is associated with a plurality of columns in table C, one row in table C is downwardly associated with a plurality of arrays in table D, thus creating a page of data as a whole. To simplify the structure of the data table, any one of the elements (a1, a2, a3, b1, etc.) in table D as shown in FIG. 3 represents "a piece of data" (DataAdds, DataAdde, DataAddc) and occupies one row of address space in table D.

Based upon the above-described three-level storage table, a data table lookup apparatus is provided, through which management operations for many types of data can be supported simultaneously. This apparatus implements insertion, update, deletion and query operations on this multilevel storage table by means of an upper-layer command module. In particular, the insertion, update, deletion and query operations on this multilevel storage table are illustrated below:

1) Insertion, which May be Classified into Three Types:

The first insertion type: new page insertion:

That is, "the first piece of data of one page" is inserted, which is also equivalent to the "column head" of the first column, and in the "first array", is conceived as the first piece of data, e.g., a1 in FIG. 3. Table T is queried according to an input address (table_id), and if the status value of this row is 0, then a new insertion address and data are requested from table D, and new data is inserted into the requested new address; then, a new idle address is requested from table C and new data is inserted, both BlockStart and BlockEnd in table Care blank addresses requested by table D, Block-Num=1; then, a row of new data is inserted into table T at the input address, where both ColAdds and ColAdde are new idle addresses requested by the above table C, Col-Num=1.

Upon completion of the operation, table T in the multilevel storage table is as shown in FIG. 4, table C as shown in FIG. 5, and table D as shown in FIG. 6.

The second insertion type: column lengthening insertion;

Data is added after the existing data columns. For instance, data a4 is added after the last piece of data a3 of column A in FIG. 3, so that its connection relationship becomes a1→a2→a3→a4. Table T is queried according to the input address table_id, so as to obtain Status, Colnum, ColAdds, and Coladde; status value status=1 indicates that this page is already present, and then input data ColID (ColID>0) is compared with the numerical value of Colnum in table T. If the input ColID is less than Colnum, then the second insertion type is column lengthening insertion, and if the input ColID is not less than Colnum, then the third insertion type is new column insertion.

With regard to the second insertion type, it is assumed that ColID=1. Thus, starting from ColAdds, table C is queried according to the connection relationship (Nxtaddr, Conseq) of table C, and the number of queries is counted. When the result of counting is equal to ColID=1, querying is stopped, and address BlockEnd of this row, i.e., the insertion address of data a3, is recorded and here is denoted as addr_3; after table D finds new idle ID, a row of new data is inserted after addr_3, after which storage information in a storage address of a3 in table D is updated; subsequently, the numerical value of BlockEnd of the first column of array A in table C is updated as the insertion address of a4, i.e., new idle address queried by table D during the above process, BlockStart remains unchanged, and BlockNum is incremented by 1.

Upon completion of the operation, table C in the multilevel storage table is as shown in FIG. 7, table D as shown in FIG. 8, and there is no change in table T.

The third insertion type: new column insertion:

A new column is added into one "page" in which data is already present (columns are present). As shown in FIG. 3, three columns of data are already present in page M, a new column H is added, the down connection relationship of the columns in table C corresponding to address M becomes D→E→F→G→H, and at the same time, "a piece of data" h1 is also written into the new address in table D. The first few steps are consistent with those in the second insertion type, i.e., querying the information in table T. Input data ColID (ColID>0) is compared with Colnum in table T, and if the input ColID=4>Colnum=3 at this moment, then the third insertion type is confirmed; an insertion operation is performed after requesting of the idle address and data by table D, and here, the insertion address for a new row of data is recorded as addr h1; then, a new row of data is inserted after the query for idle address (H) in table C, where BlockStart and BlockEnd are addr h1, BlockNum=1; afterwards, a row of data at the input address tablut-id in table T is updated, ColAdds remains unchanged and is still the address of A, the original address C for Coladde has been changed to idle address H queried by table C, and Colnum is incremented by 1.

Upon completion of the operation, table T in the multilevel storage table is as shown in FIG. 9, table C as shown in FIG. 10, and table D as shown in FIG. 11.

2) Update:

The address locations that need to be updated are found in accordance with the input and the data relationship of internal storage tables, and a new DataAddc is updated inside table D.

3) Deletion:

All the relevant data within the multilevel storage table is deleted according to the input table_id, i.e., all the status values in table C become 0, all the data status values in the arrays of table D become 0, and the page status location of table T is 0. According to the table as shown in FIG. 3, when the input table_id is equal to the insertion address of page M, data stored at address ABC in table C as well as arrays a1-a3, b1-b1-b5 and c1-c4 in table D are all deleted, with the corresponding status flag signals being set as 0.

4) query:

Based on the input address, all the data at this input address in table D is output, i.e., a group of data DataAdds, DataAdde, DataAddc, DownBAdd, Downseq, UpBadd, and Upseq is output.

Based on the same inventive concept, the embodiments of the present invention also provide a database management apparatus based on a lookup table, as described in the following embodiments. The database management apparatus based on a lookup table has the similar problem-solving principle to the database management method based on a lookup table, so for the implementation of the database management apparatus based on a lookup table, reference can be made to the implementation of the database management method based on a lookup table, and repeated description is omitted herein. As used below, terms "unit" or "module" are combinations of software and/or hardware that can achieve preset functions. Even though the apparatus described in the following embodiments is implemented preferably in software, implementation in hardware or in the combination of software and hardware is also possible and can be envisioned. FIG. 12 is a structural block diagram of the database management apparatus based on a lookup table according to the embodiments of the present invention. As shown in FIG. 12, this apparatus may include: an acquiring module 1201, a retrieving module 1202, and an adjusting module 1203. An explanation of this structure is given below.

The acquiring module 1201 is configured to acquire a data management operation request;
  the retrieving module 1202 is configured to retrieve a three-level storage table in response to the data management operation request; and
  the adjusting module 1203 is configured to adjust the three-level storage table according to an operation requested by the data management operation request, so as to obtain the adjusted three-level storage table, wherein the three-level storage table includes: a page information table of data for recording information of a page of data by means of a row of data and associating same with a plurality of columns in a column information table of data; the column information table of data for recording information of an array in a data table by means of a row of data and associating same with a plurality of arrays in the data table; and the data table for recording information of a piece of data by means of a row of data.

In an implementation, the above data management operation request may include, but is not limited to, at least one of: an insertion operation request, an update operation request, a deletion operation request, and a query operation request.

In an implementation, the above insertion operation request may include, but is not limited to, at least one of: a new page insertion request, a column lengthening insertion request, and a new column insertion request.

In an implementation, the above adjusting module 1203 may include: a querying unit configured to request, in case that the data management operation request is the new page insertion request, an insertion address and data from a data table in case that a status value of rows indicated by the input address is determined to be 0; a first inserting unit configured to insert, into the requested insertion address, data to be inserted; a second inserting unit configured to request an idle address from a column information table of data and insert column information, wherein an address for storage of a first piece of data and an address for storage of a last piece of data in the column information are both set as the insertion address requested from the data table; and a third inserting unit configured to insert, into the page information table of data, a row of data for characterizing page data information requested to be inserted by the new page insertion request.

In an implementation, the apparatus is implemented based on a field programmable gate array (FPGA) or an application-specific integrated circuit (ASIC).

The embodiments of the present invention also provide a nonvolatile computer-readable storage medium having a computer program stored thereon that, when executed by a processor, generates the apparatus according to any of the above embodiments.

The embodiments of the present invention also provide an electronic device, including: a memory, a processor, and a computer program stored on the memory and runnable on the processor, and said processor implements the steps of the above method when executing said computer program.

The embodiments of the present invention also provide the specific implementation of an electronic device capable of implementing all the steps of the database management method based on a lookup table in the above embodiments, and in particular, said electronic device includes: a processor, a memory, a communications interface, and a bus, wherein said processor, memory, and communications interface are communicated with each other via said bus; said processor is configured to call the computer program in said memory, said processor implements all the steps of the database management method based on a lookup table in the above embodiments when executing said computer program, for example, said processor implements the following steps when executing said computer program:

S1: acquiring a data management operation request;
S2: retrieving a three-level storage table in response to the data management operation request; and
S3: adjusting the three-level storage table according to an operation requested by the data management operation request, so as to obtain the adjusted three-level storage table;
wherein the three-level storage table includes: a page information table of data for recording information of a page of data by means of a row of data and associating same with a plurality of columns in a column information table of data; the column information table of data for recording information of an array in a data table by means of a row of data and associating same with a plurality of arrays in the data table; and the data table for recording information of a piece of data by means of a row of data.

As can be seen from the description given above, provided is a database management method based on a lookup table, in which a three-level storage table is set to store: page information of data, column information of data, and data, respectively, such that the problem of the low efficiency of existing database management based on a lookup table is solved, and the aim of simply and efficiently carrying out a lookup table operation is thus achieved.

The embodiments of the present application also provide a computer-readable storage medium capable of implementing all the steps of the database management method based on a lookup table in the above embodiments, said computer-readable storage medium has a computer program stored thereon that, when executed by a processor, implements all the steps of the database management method based on a lookup table in the above embodiments, for example, said processor implements the following steps when executing said computer program:

S1: acquiring a data management operation request;
S2: retrieving a three-level storage table in response to the data management operation request; and
S3: adjusting the three-level storage table according to an operation requested by the data management operation request, so as to obtain the adjusted three-level storage table;
wherein the three-level storage table includes: a page information table of data for recording information of a page of data by means of a row of data and associating same with a plurality of columns in a column information table of data; the column information table of data for recording information of an array in a data table by means of a row of data and associating same with a plurality of arrays in the data table; and the data table for recording information of a piece of data by means of a row of data.

As can be seen from the description given hereinabove, provided is a database management method based on a lookup table, in which a three-level storage table is set to store: page information of data, column information of data, and data, respectively, such that the problem of the low efficiency of existing database management based on a lookup table is solved, and the aim of simply and efficiently carrying out a lookup table operation is thus achieved.

The various embodiments in this specification are all described in a progressive manner, the identical or similar parts among the various embodiments can be referred to each other, and each embodiment focuses on its differences from other embodiments. In particular, for the hardware+program embodiment, its description is relatively simple since it is substantially similar to the method embodiment. For the relevant details, reference shall be made to the description of the sections in the method embodiment.

The specific embodiments of this specification are described above. Other embodiments are within the scope of the appended claims. In some cases, the actions or steps stated in the claims can be performed in a different order than in the embodiments and can still achieve desired outcomes. In addition, the processes depicted in the drawings do not necessarily require the shown specific order or sequential order to achieve desired outcomes. In some implementations, multitask processing and parallel processing are also possible or may be advantageous.

Even though the present application provides method operation steps as described in the embodiments or flowchart, based on conventional or non-creative efforts, more or fewer operation steps may be included. The step sequence listed in the embodiments is merely one of the various sequences of step execution, and does not represent the only sequence of execution. During actual execution of the apparatus or customer-side product, sequential execution or parallel execution is possible in accordance with the method shown in the embodiments or accompanying drawings (e.g., in a parallel processor or a multithread processing environment).

The system, apparatus, module or unit illustrated in the above embodiments may be specifically implemented by using a computer chip or an entity, or a product having a certain function. A typical implementation device is a computer. Specifically, the computer may be, for example, a personal computer, a laptop computer, a vehicle-mounted human-computer interaction device, a cellular phone, a camera phone, a smart phone, a personal digital assistant, a media player, a navigation device, an email device, a game console, a tablet computer, a wearable device, or combinations of any of these devices.

Even though the embodiments of this specification provide the method operation steps as described in the embodiments or flowchart, based on conventional or non-creative means, more or fewer operation steps may be included. The step sequence listed in the embodiments is merely one of the various sequences of step execution, and does not represent the only sequence of execution. During actual execution of the apparatus or end product, sequential execution or parallel execution is possible in accordance with the methods shown in the embodiments or accompanying drawings (e.g., in a parallel processor or a multithread processing environment, even in a distributed data processing environment). The term "include", "comprise" or any other variations thereof are intended to cover non-exclusive inclusion, so that a process, method, product or device including a series of elements includes not only those elements, but also other elements that are not clearly listed, or further includes inherent elements of this process, method, product or device. In case of no more limitations, such a case is not excluded where additional identical or equivalent elements are present in the process, method, product or device including said elements.

For ease of description, when the above apparatus is described, it is divided into various modules in terms of functions for respective descriptions. Definitely, when the embodiments of this specification are implemented, the functions of various modules may be implemented in same or multiple pieces of software and/or hardware, or the modules that implement the same function may also be implemented through combinations of a plurality of sub-modules or subunits. The apparatus embodiment described above is merely exemplary. For example, the division of said units is only a logical function division, and there may be other divisions in actual implementation, e.g., multiple units or components may be combined or may be integrated to another system, or some features may be omitted, or not implemented. In addition, the shown or discussed mutual coupling or direct coupling or communication connection may be indirect coupling or communication connection through some interfaces, apparatuses or units, and may be in electrical, mechanical, or other forms.

Those skilled in the art also know that in addition to implementing a controller in a pure computer-readable program code manner, it is completely possible to program the method steps in a logical way, such that the controller implements the same function in the form of logic gates, switches, application-specific integrated circuits, programmable logic controllers, embedded microcontrollers and the like. Therefore, such a controller can be regarded as a hardware component, and the apparatuses included therein for implementing various functions can also be regarded as a structure inside the hardware component. Or even, the apparatus for implementing various functions can be regarded as both a software module for implementing the method and a structure inside the hardware component.

The present invention is described with reference to the flowcharts and/or block diagrams of the methods, devices (systems), and computer program products according to the embodiments of the present invention. It shall be understood that each process and/or block in the flowcharts and/or block diagrams, and the combinations of the processes and/or blocks in the flowcharts and/or block diagrams can be implemented by computer program instructions. These computer program instructions can be provided to the processor of a general-purpose computer, a special-purpose computer, an embedded processor, or other programmable data processing device to produce a machine, such that the instructions executed by the processor of the computer or other programmable data processing devices produce an apparatus that implements the functions specified in one or more processes in the flowcharts and/or one or more blocks in the block diagrams.

These computer program instructions may also be stored in a computer-readable memory that can direct the computer or other programmable data processing devices to work in a specific manner, such that the instructions stored in the computer-readable memory produce an article of manufacture including an instruction apparatus. This instruction apparatus implements the functions specified in one or more processes in the flowcharts and/or one or more blocks in the block diagrams.

These computer program instructions may also be loaded on the computer or other programmable data processing devices, such that a series of operation steps are executed on the computer or other programmable devices to produce computer-implemented processing, as a result of which the instructions executed on the computer or other programmable devices provide steps for implementing the functions specified in one or more processes in the flowcharts and/or one or more blocks in the block diagrams.

In a typical configuration, the computing device includes one or more processors (CPU), an input/output interface, a network interface, and memory.

The memory may include non-permanent memory, random access memory (RAM) and/or nonvolatile memory, etc. in a computer-readable medium, such as read-only memory (ROM) or flash memory. The memory is an example of the computer-readable medium.

The computer-readable medium includes permanent and non-permanent, removable and non-removable media, and information storage may be realized by any method or technology. Information may be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc-read-only memory (CD-ROM), digital versatile disc (DVD) or other optical storages, magnetic cassette tape, magnetic tape disk storage or other magnetic storage devices or any other non-transmission media, which can be used to store information that can be accessed by the computing device. According to the definitions herein, the computer-readable media do not include transitory media, such as modulated data signals and carrier waves.

Those skilled in the art shall appreciate that the embodiments of this specification can be provided as a method, a system, or a computer program product. Therefore, the embodiments of this specification may take the form of an entirely hardware embodiment, an entirely software embodiment, or an embodiment combining software and hardware. Moreover, the embodiments of this specification may take the form of a computer program product that is implemented on one or more computer-usable storage media (including but not limited to disk storage, CD-ROM, optical storage, etc.) containing computer-usable program codes therein.

The embodiments of this specification may be described in the general context of computer-executable instructions executed by a computer, such as program modules. Generally, the program modules include routines, programs, objects, components, data structures, etc. that perform specific tasks or implement specific abstract data types. The embodiments of this specification may also be practiced in distributed computing environments. In these distributed computing environments, tasks are performed by remote processing devices connected through a communication network. In the distributed computing environments, the program modules may be located in local and remote computer storage media including storage devices.

The various embodiments in this specification are all described in a progressive manner, the identical or similar parts among the various embodiments can be referred to each other, and each embodiment focuses on its differences from other embodiments. In particular, for the system embodiment, its description is relatively simple since it is substantially similar to the method embodiment. For the relevant details, reference shall be made to the description of the sections in the method embodiment. In the description of this specification, those descriptions with reference to the terms "one embodiment", "some embodiments", "examples", "specific examples", or "some examples" etc. mean that specific features, structures, materials or characteristics described in conjunction with this embodiment or example are included in at least one embodiment or example of the embodiments of this specification. In this specification, schematic representations of the above terms are not necessarily directed to the same embodiment or example. Moreover, the described specific features, structures, materials or characteristics may be combined in any one or more embodiments or examples in a suitable way. In addition, those skilled in the art can incorporate and combine different embodiments or examples and the features of the different embodiments or examples described in this specification, without contradicting each other.

The foregoing descriptions are only examples of the embodiments of this specification, and are not used to limit the embodiments of this specification. For those skilled in the art, various modifications and changes can be made to the embodiments of this specification. Any modification, equivalent substitution, improvement or the like made within the spirit and principle of the embodiments of this specification shall be included in the scope of the claims of the embodiments of this specification.

What is claimed is:

1. A database management method based on a lookup table, comprising:
    acquiring a data management operation request;
    retrieving a three-level storage table in response to the data management operation request; and
    adjusting the three-level storage table according to an operation requested by the data management operation request, so as to obtain the adjusted three-level storage table,
    wherein the three-level storage table comprises: a page information table of data for recording information of a page of data by means of a row of data and associating the row of data of the page information table with a plurality of columns in a column information table of data; the column information table of data for recording information of an array in a data table by means of a row of data and associating the row of data of the column information table with a plurality of arrays in the data table; and the data table being used as a storage table for multiple rows of data, for recording information of a piece of data by means of a row of data, the multiple rows of data forming one array;
    wherein the page of data in the page information table records a column group composed of a plurality of columns, each of the columns is one array, and each row of the page information table records: the start address for storage of the first column of array and the end address for storage of the last column of array in the associated column information table, the number of columns, and a status bit indicating validity of the row of data; and
    wherein each row of the column information table stores: the number of data in an array of an associated data table, address for storage of the first piece of data in the array, address for storage of the last piece of data in the array, and a status bit indicating validity of the address of the array.

2. The method according to claim 1, wherein the data management operation request comprises at least one of: an insertion operation request, an update operation request, a deletion operation request, and a query operation request.

3. The method according to claim 2, wherein the insertion operation request comprises at least one of: a new page insertion request, a column lengthening insertion request, and a new column insertion request.

4. The method according to claim 3, wherein in case that the data management operation request is the new page insertion request, adjusting the three-level storage table according to the data management operation request so as to obtain the adjusted three-level storage table comprises:
    querying, in response to the new page insertion request, a page information table of data according to an input address in the new page insertion request;
    requesting an insertion address and data from a data table in case that a status value of rows indicated by the input address is determined to be 0;
    inserting, into the requested insertion address, data to be inserted;
    requesting an idle address from a column information table of data and inserting column information, wherein an address for storage of a first piece of data and an address for storage of a last piece of data in the column information are both set as the insertion address requested from the data table; and
    inserting, into the page information table of data, a row of data for characterizing page data information requested to be inserted by the new page insertion request.

5. The method according to claim 3, wherein in case that the data management operation request is the column lengthening insertion request, adjusting the three-level storage table according to the data management operation request so as to obtain the adjusted three-level storage table comprises:
    querying, in response to the column lengthening insertion request, a page information table of data according to an input address in the column lengthening insertion request, so as to obtain a corresponding status value, a number of columns in a column group, an address of a first column of the column group, and an address of a last column of the column group;
    determining, through the status value, whether this page is present;
    comparing input data in the column lengthening insertion request with a numerical value for the number of columns in the column group if this page is present; querying, starting from the address of the first column of the column group, a column information table of data according to a connection relationship of the column information table of data if the input data is less than the number of columns in the column group; and counting the number of queries;
    stopping querying when the result of counting is equal to the input data, and recording an address of the last piece of data of an array of this row;

searching the database for a new idle address, inserting a row of data after the recorded address of the last piece of data of the array of this row, and then updating storage information in a storage address of the last piece of data of the data of this row; and updating the column information table of data.

6. The method according to claim 3, wherein in case that the data management operation request is the new column insertion request, adjusting the three-level storage table according to the data management operation request so as to obtain the adjusted three-level storage table comprises:

querying, in response to the new column insertion request, a page information table of data according to an input address in the new column insertion request, so as to obtain a corresponding status value, a number of columns in a column group, an address of a first column of the column group, and an address of a last column of the column group;

determining, through the status value, whether this page is present;

comparing input data in the new column insertion request with a numerical value for the number of columns in the column group if this page is present, and if the input data is greater than the number of columns in the column group, then performing an insertion operation after requesting of an idle address by the data table; and updating the page information table of data and the column information table of data after the insertion is completed.

7. The method according to claim 1, wherein the column information table further stores valid flag for down connection of multiple rows of data as well as down connection address of the column group, and the multiple rows of data of the column information table are connected together through down connection information and are represented as the column group as one page.

8. A database management apparatus based on a lookup table, comprising a memory, a processor and a computer program stored in the memory and runnable on the processor, wherein when executed by the processor, the computer program implements a database management method based on a lookup table, the method comprising:

acquiring a data management operation request;

retrieving a three-level storage table in response to the data management operation request; and adjusting the three-level storage table according to an operation requested by the data management operation request, so as to obtain the adjusted three-level storage table, wherein the three-level storage table comprises:

a page information table of data for recording information of a page of data by means of a row of data and associating the row of data of the page information table with a plurality of columns in a column information table of data; the column information table of data for recording information of an array in a data table by means of a row of data and associating the row of data of the column information table with a plurality of arrays in the data table; and the data table being used as a storage table for multiple rows of data, for recording information of a piece of data by means of a row of data, the multiple rows of data forming one array;

wherein the page of data in the page information table records a column group composed of a plurality of columns, each of the columns is one array, and each row of the page information table records: the start address for storage of the first column of array and the end address for storage of the last column of array in the associated column information table, the number of columns, and a status bit indicating validity of the row of data; and wherein each row of the column information table stores: the number of data in an array of an associated data table, address for storage of the first piece of data in the array, address for storage of the last piece of data in the array, and a status bit indicating validity of the address of the array.

9. The apparatus according to claim 8, wherein the data management operation request comprises at least one of: an insertion operation request, an update operation request, a deletion operation request, and a query operation request.

10. The apparatus according to claim 9, wherein the insertion operation request comprises at least one of: a new page insertion request, a column lengthening insertion request, and a new column insertion request.

11. The apparatus according to claim 10, wherein in case that the data management operation request is the new page insertion request, adjusting the three-level storage table according to the data management operation request so as to obtain the adjusted three-level storage table comprises:

querying, in response to the new page insertion request, a page information table of data according to an input address in the new page insertion request;

requesting an insertion address and data from a data table in case that a status value of rows indicated by the input address is determined to be 0;

inserting, into the requested insertion address, data to be inserted;

requesting an idle address from a column information table of data and inserting column information, wherein an address for storage of a first piece of data and an address for storage of a last piece of data in the column information are both set as the insertion address requested from the data table; and inserting, into the page information table of data, a row of data for characterizing page data information requested to be inserted by the new page insertion request.

12. The apparatus according to claim 8, wherein the apparatus is implemented based on a field programmable gate array or an application-specific integrated circuit.

13. The apparatus according to claim 10, wherein in case that the data management operation request is the column lengthening insertion request, adjusting the three-level storage table according to the data management operation request so as to obtain the adjusted three-level storage table comprises:

querying, in response to the column lengthening insertion request, a page information table of data according to an input address in the column lengthening insertion request, so as to obtain a corresponding status value, a number of columns in a column group, an address of a first column of the column group, and an address of a last column of the column group;

determining, through the status value, whether this page is present;

comparing input data in the column lengthening insertion request with a numerical value for the number of columns in the column group if this page is present;

querying, starting from the address of the first column of the column group, a column information table of data according to a connection relationship of the column information table of data if the input data is less than the number of columns in the column group; and counting the number of queries;

stopping querying when the result of counting is equal to the input data, and recording an address of the last piece of data of an array of this row;

searching the database for a new idle address, inserting a row of data after the recorded address of the last piece of data of the array of this row, and then updating storage information in a storage address of the last piece of data of the data of this row; and updating the column information table of data.

14. The apparatus according to claim 10, wherein in case that the data management operation request is the new column insertion request, adjusting the three-level storage table according to the data management operation request so as to obtain the adjusted three-level storage table comprises:

querying, in response to the new column insertion request, a page information table of data according to an input address in the new column insertion request, so as to obtain a corresponding status value, a number of columns in a column group, an address of a first column of the column group, and an address of a last column of the column group;

determining, through the status value, whether this page is present;

comparing input data in the new column insertion request with a numerical value for the number of columns in the column group if this page is present, and if the input data is greater than the number of columns in the column group, then performing an insertion operation after requesting of an idle address by the data table; and updating the page information table of data and the column information table of data after the insertion is completed.

15. A nonvolatile computer-readable storage medium having a computer program stored thereon, wherein the computer program, when executed by a processor, a database management method based on a lookup table is implemented which comprises the following steps:

acquiring a data management operation request;

retrieving a three-level storage table in response to the data management operation request; and adjusting the three-level storage table according to an operation requested by the data management operation request, so as to obtain the adjusted three-level storage table, wherein the three-level storage table comprises: a page information table of data for recording information of a page of data by means of a row of data and associating the row of data of the page information table with a plurality of columns in a column information table of data; the column information table of data for recording information of an array in a data table by means of a row of data and associating the row of data of the column information table with a plurality of arrays in the data table; and the data table being used as a storage table for multiple rows of data, for recording information of a piece of data by means of a row of data, the multiple rows of data forming one array;

wherein the page of data in the page information table records a column group composed of a plurality of columns, each of the columns is one array, and each row of the page information table records: the start address for storage of the first column of array and the end address for storage of the last column of array in the associated column information table, the number of columns, and a status bit indicating validity of the row of data; and wherein each row of the column information table stores: the number of data in an array of an associated data table, address for storage of the first piece of data in the array, address for storage of the last piece of data in the array, and a status bit indicating validity of the address of the array.

16. The nonvolatile computer-readable storage medium according to claim 15, wherein the data management operation request comprises at least one of: an insertion operation request, an update operation request, a deletion operation request, and a query operation request.

17. The nonvolatile computer-readable storage medium according to claim 16, wherein the insertion operation request comprises at least one of: a new page insertion request, a column lengthening insertion request, and a new column insertion request.

18. The nonvolatile computer-readable storage medium according to claim 17, wherein in case that the data management operation request is the new page insertion request, adjusting the three-level storage table according to the data management operation request so as to obtain the adjusted three-level storage table comprises:

querying, in response to the new page insertion request, a page information table of data according to an input address in the new page insertion request;

requesting an insertion address and data from a data table in case that a status value of rows indicated by the input address is determined to be 0;

inserting, into the requested insertion address, data to be inserted;

requesting an idle address from a column information table of data and inserting column information, wherein an address for storage of a first piece of data and an address for storage of a last piece of data in the column information are both set as the insertion address requested from the data table; and inserting, into the page information table of data, a row of data for characterizing page data information requested to be inserted by the new page insertion request.

19. The nonvolatile computer-readable storage medium according to claim 17, wherein in case that the data management operation request is the column lengthening insertion request, adjusting the three-level storage table according to the data management operation request so as to obtain the adjusted three-level storage table comprises:

querying, in response to the column lengthening insertion request, a page information table of data according to an input address in the column lengthening insertion request, so as to obtain a corresponding status value, a number of columns in a column group, an address of a first column of the column group, and an address of a last column of the column group;

determining, through the status value, whether this page is present;

comparing input data in the column lengthening insertion request with a numerical value for the number of columns in the column group if this page is present;

querying, starting from the address of the first column of the column group, a column information table of data according to a connection relationship of the column information table of data if the input data is less than the number of columns in the column group; and counting the number of queries;

stopping querying when the result of counting is equal to the input data, and recording an address of the last piece of data of an array of this row;

searching the database for a new idle address, inserting a row of data after the recorded address of the last piece of data of the array of this row, and then updating storage information in a storage address of the last piece of data of the data of this row; and updating the column information table of data.

20. The nonvolatile computer-readable storage medium according to claim 17, wherein in case that the data management operation request is the new column insertion request, adjusting the three-level storage table according to the data management operation request so as to obtain the adjusted three-level storage table comprises:

querying, in response to the new column insertion request, a page information table of data according to an input address in the new column insertion request, so as to obtain a corresponding status value, a number of columns in a column group, an address of a first column of the column group, and an address of a last column of the column group;

determining, through the status value, whether this page is present;

comparing input data in the new column insertion request with a numerical value for the number of columns in the column group if this page is present, and if the input data is greater than the number of columns in the column group, then performing an insertion operation after requesting of an idle address by the data table; and updating the page information table of data and the column information table of data after the insertion is completed.

* * * * *